(12) United States Patent
Luo et al.

(10) Patent No.: US 7,308,400 B2
(45) Date of Patent: Dec. 11, 2007

(54) ADAPTATION OF STATISTICAL PARSERS BASED ON MATHEMATICAL TRANSFORM

(75) Inventors: Xiaoqiang Luo, White Plains, NY (US); Salim E. Roukos, Scarsdale, NY (US); Robert T. Ward, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 09/737,259

(22) Filed: Dec. 14, 2000

(65) Prior Publication Data

US 2002/0111793 A1    Aug. 15, 2002

(51) Int. Cl.
*G06F 17/27* (2006.01)
*G10L 15/18* (2006.01)

(52) U.S. Cl. .......................................... 704/9; 704/257
(58) Field of Classification Search ................ 704/256, 704/240, 9, 2
See application file for complete search history.

(56) References Cited

U.S. PATENT DOCUMENTS

| | | | | |
|---|---|---|---|---|
| 4,864,501 | A | * | 9/1989 | Kucera et al. .................. 704/8 |
| 5,752,052 | A | * | 5/1998 | Richardson et al. ............ 704/9 |
| 5,822,731 | A | * | 10/1998 | Schultz ..................... 704/270.1 |
| 5,878,386 | A | * | 3/1999 | Coughlin ...................... 704/10 |
| 5,930,746 | A | * | 7/1999 | Ting ............................... 704/9 |
| 6,058,365 | A | * | 5/2000 | Nagai et al. ................. 704/257 |
| 6,078,884 | A | * | 6/2000 | Downey ...................... 704/243 |
| 6,275,791 | B1 | * | 8/2001 | Weise ............................. 704/9 |
| 6,865,528 | B1 | * | 3/2005 | Huang et al. ................... 704/9 |

OTHER PUBLICATIONS

Miller et al., A Fully Statistical Approach to Natural Language Interfaces, 1996, Proceedings of the 34th conference on Association for Computational Linguistics.*
Kita et al., HMM Continuous Speech Recognition Using Predictive LR Parsing, 1989, Acoustics, Speech, and Signal Processing ICASSP-89.*
Goddeau et al. Integrating probabilistic LR parsing into speech understanding systems, 1992, International Conference on Acoustics, Speech, and Signal Processing.*
D. Magerman, "Statistical Decision-Tree Models for Parsing", Proc. Annual Meeting of the Assoc. for Computational Linguistics, pp. 276-283, 1995.
M. Collins, "A New Statistical Parser Based on Bigram Lexical Dependencies", Proc. Annual Meeting of the Assoc. for Computational Linguistics, pp. 84-191, 1996.
X. Luo et al., "Unsupervised Adaptation of Statistical Parsers Based on Markov Transform", Proc. of IEEE Workshop on Automatic Speech Recognition and Understanding, Keystone, CO, 1999.

(Continued)

*Primary Examiner*—Tālivaldis Ivars Šmits
(74) *Attorney, Agent, or Firm*—Ference & Associates LLC

(57) ABSTRACT

An arrangement for adapting statistical parsers to new data using a mathematical transform, particularly a Markov transform. In particular, it is assumed that an initial statistical parser is available and a batch of new data is given. The initial model is mapped to a new model by a Markov matrix, each of whose rows sums to one. In the unsupervised setup, where "true" parses are missing, the transform matrix is obtained by maximizing the log likelihood of the parses of test data decoded using the model before adaptation. The proposed algorithm can be applied to supervised adaptation, as well.

25 Claims, 1 Drawing Sheet

OTHER PUBLICATIONS

C.J. Leggetter et al., "Maximum likelihood linear regression for speaker adaptation of continuous density hidden Markov models", Cambridge University, Academic Press, pp. 172-185 1995.

M. Gales et al., "Mean and variance adaptation within the MLLR framework", Computer Speech and Language, pp. 249-264, 1996.

* cited by examiner

ADAPTATION OF STATISTICAL PARSERS BASED ON MATHEMATICAL TRANSFORM

FIELD OF THE INVENTION

The present invention generally relates to statistical parsing and transform-based model adaptation, including methods and arrangements for providing the same.

BACKGROUND OF THE INVENTION

Statistical parsing (see: Jelinek et al., "Decision tree parsing using a hidden derivation model", Proc. ARPA Human Language Technology Workshop, pp. 272-277, 1994; Magerman, "Statistical decision-tree models for parsing", Proc. Annual Meeting of the Association for Computational Linguistics, pp. 276-283, 1995; Collins, "A new statistical parser based on bigram lexical dependencies", Proc. Annual Meeting of the Association for Computational Linguistics", pp. 184-191, 1996; Charniak, "Statistical parsing with context-free grammar and word statistics", Proceedings of the 14th National Conference on Artificial Intelligence, 1997; and Collins, "Three generative, lexcialised models for statistical parsing", Proc. Annual Meeting of the Association for Computational Linguistics, pp. 16-23, 1998) has recently shown great success; in fact, close to 90% label precision and recall can now be achieved (see Collins, "Three . . . ", supra). A statistical model is typically constructed by extracting statistics from a large human-annotated corpus. During testing, the statistical model is used to select the parses of input sentences. One issue is that if test data are different in nature from the training data, the performance of a parser will become worse than that of a matched condition.

In order to adapt a statistical model to newly-acquired data, various methods have been proposed in the area of language modeling, which range from interpolating a static model with a dynamic-cache model (see: Jelinek et al., "A dynamic language model for speech recognition", Proc. of the DARPA Workshop on Speech and Natural Language", pp. 293-295, February 1991; Kupiec, "Probabilistic model of short and long distance word dependencies in running text", Proc. of the DARPA Workshop on Speech and Natural Language, pp. 290-295, February 1989; and Kuhn et al., "A cache-based natural language model for speech recognition", IEEE Transactions on Pattern Analysis and Machine Intelligence, 12(6):570-583, 1990) to more sophisticated methods using the Maximum Entropy principle (see: Lau et al., "Adaptive language modeling using the maximum entropy principle", Proc. of the ARPA Human Language Technology Workshop, pp. 108-113, March 1993; and Rosenfeld, "Adaptive Statistical Language Modeling: A Maximum Entropy Approach", PhD thesis, School of Computer Science, Carnegie Mellon University, 1994). These methods can be viewed as smoothing the static model given constraints imposed by, or statistics extracted from the new data. In other developments, transform-based model adaptation (see: Gales et al., "Mean and variance adaptation within the MLLR framework", Computer Speech and Language, 10:249-264, October 1996; and Leggetter et al., "Maximum likelihood linear regression for speaker adaptation of continuous density hidden Markov models", Computer Speech and Language, 9:171-185, October 1995) has been proven successful in capturing channel or speaker variations during the testing of a speech recognizer.

Generally, it has been observed that there is significant performance degradation when a statistical parser is tested on material whose style is different from that of its training material. A straightforward way of improving parsing accuracy is to collect more training data similar to test material and re-train the parser. However, the approach is not appealing in that collecting and annotating data is labor- and time-intensive.

Accordingly, a need has been recognized in connection with improving the performance of a statistical parser by adjusting or adapting the model parameters such that the adapted model can better capture the underlying regularity of test material.

SUMMARY OF THE INVENTION

In accordance with at least one presently preferred embodiment of the present invention, an arrangement is contemplated for adapting statistical parsers to new data using Markov transform. In particular, it is assumed that an initial statistical parser is available and a batch of new data is given. In unsupervised adaptation, however, true parses of the new data are not available. The initial model preferably includes a finite collection of probability mass functions (pmf's). Broadly contemplated herein is the transformation of the pmf's into a new model via Markov matrices. These Markov matrices are preferably obtained by maximizing the likelihood of test data with respect to the decoded parses using the initial model. The adaptation scheme may also be carried out iteratively.

It will be appreciated that a technique carried out in accordance with at least one preferred embodiment of the present invention will not require annotating more data at all during the unsupervised setup. Therefore, an expensive data-collection process is eliminated, while the performance of a statistical parser is improved.

In summary, one aspect of the present invention provides a method for providing statistical parsing, the method comprising the steps of: providing a statistical parser, the statistical parser including a statistical model which decodes at least one type of input; and adapting the statistical model via employing a mathematical transform.

An additional aspect of the present invention provides an apparatus for providing statistical parsing, the apparatus comprising: a statistical parser; the statistical parser including a statistical model which decodes at least one type of input; and an adapter which adapts the statistical model via employing a mathematical transform.

Furthermore, another aspect of the present invention provides a program storage device readable by machine, tangibly embodying a program of instructions executable by the machine to perform method steps for providing statistical parsing, the method comprising the steps of: providing a statistical parser, the statistical parser including a statistical model which decodes at least one type of input; and adapting the statistical model via employing a mathematical transform.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
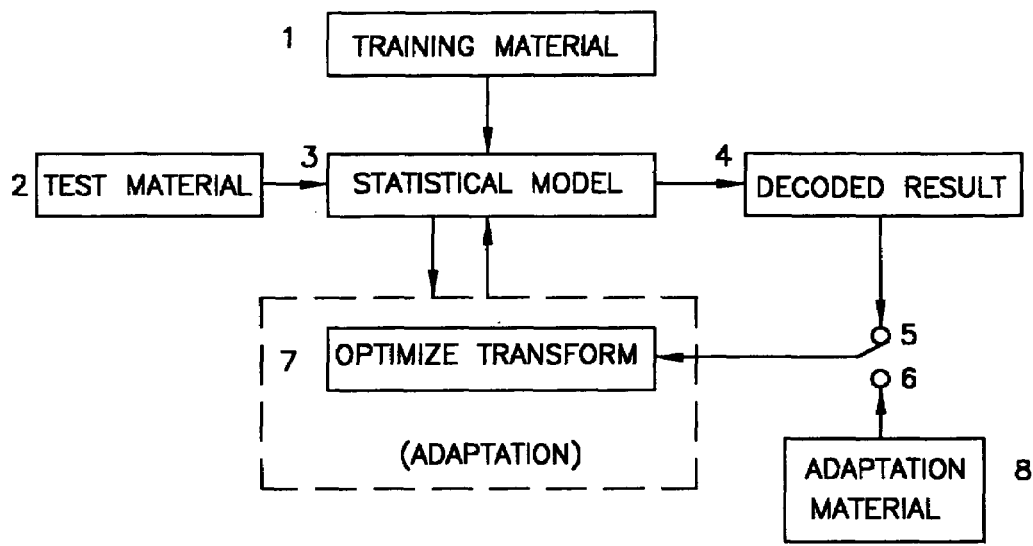
FIG. 1 schematically illustrates a general framework of the adaptation of a statistical parser.

Referring to FIG. 1, a statistical parser is typically trained with a corpus of annotated sentences 1. The statistical model, or the parser, is represented by a set of a finite number of probability mass functions (pmf's) 3 which can be used to rank parses of an un-annotated sentence, or to test material at box 2. The results are shown as "decoded result" 4.

The accuracy of the parser can be improved by adapting the model parameter in box 3. In this connection, FIG. 1 illustrates a general framework of adapting a statistical parser, which is applicable to both supervised adaptation and unsupervised adaptation. "Supervised adaptation" implies that there is a set of annotated adaptation data 8 available. In the setup of unsupervised adaptation, however, only the unadapted model and test material are available.

In both supervised and unsupervised adaptation, the unadapted model and the adapted model are related to each other by one or more transforms. At least one presently preferred embodiment of the present invention broadly contemplates the use of the Markov transform, where a probability mass function (pmf), written as a row vector, in the unadapted model is right-multiplied by a Markov matrix, each of whose elements is non-negative and each of whose rows sums to 1. It can easily be checked that the transformed vector is also a pmf. The optimal Markov matrix is chosen such that the log probability of either the decoded parses of test material (unsupervised adaptation) or adaptation material (supervised adaptation) is maximized. It can be shown that this objective function is convex. Finding the optimal Markov matrix means maximizing this convex function subject to linear constraints. While Markov transform is simple and effective, it is conceivable that the use of other types of transforms is possible.

The data flow for unsupervised adaptation (i.e., when the switch in FIG. 1 is connected at 5) is as follows: first, the unadapted model is used to find parses of test material. The resulting parses of test material and the unadapted model are then passed to the optimization module 7, which finds the optimal Markov matrix. The optimal Markov matrix is used to calculated a new model, which can be used to parse the test material again. This process can be iterated for more than one time.

The data flow for supervised adaptation (i.e., when the switch in FIG. 1 is connected at 6) is as follows: The optimal transform is found using adaptation material 8 as supervision information. This optimal transform is then used to compute a new model, which is then used to parse the test material. This process can also be iterated for more than one time.

It has been found that unsupervised adaptation can reduce parsing errors by 20% to 30% (relative).

The balance of the disclosure relates to a more detailed discussion of Markov transforms and the manner in which they may be utilized in accordance with the embodiments of the present invention.

First, it should be pointed out that the problems addressed in accordance with at least one embodiment of the present invention differ from maximum likelihood linear regression (MLLR) (see Gales et al. and Leggetter et al, supra) in acoustic modeling in two aspects. First of all, a statistical parser is typically discrete, while hidden Markov models (HMM) with continuous density are parametric. One reason to choose the Markov matrix is that it is guaranteed that adapted models are valid pmf's. Because of inherent constraints (i.e., each row has to sum to 1) on Markov matrices, one will have a constrained optimization problem, while the MLLR adaptation of Gaussian means of a HMM is an unconstrained optimization problem. Secondly, an acoustic model in which speech recognition is a generative model which computes the probability of an acoustic observation given its corresponding word sequence. On the other hand, the presently contemplated statistical parser computes the probability of a parse directly given a sentence (or observation). It cannot be used to generate text. In this sense, posterior probabilities are being adapted.

The disclosure now turns to a detailed discussion of a proposed Markov transform.

In connection with the Markov transform, let the initial model be $M_0$, which includes M probability mass functions (pmf's):

$$M_0 = \{P_e : P_e \text{ is a pmf}; e=1,2,L, M\} \quad (1)$$

Let K be the dimension of each (row vector) $P_e$. The $i^{th}$ component of $P_e$ will be written as $P_e(i)$. When a new batch of data $C_1$ is acquired, it can be decoded using the model $M_0$. Let $C_e(i)$ bet the count for the $i^{th}$ component of $P_e$ collected using data $C_1$.

Consider a K×K Markov matrix $Q=[q_{ij}]$. Elements in Q are non-negative and each row of Q sums to 1: $\Sigma_{j=1}^{K} q_{ij}=1$ for all i=1, 2, L, K. The transform is defined as:

$$\hat{P}_e = P_e Q, \quad (2)$$

where both $\hat{P}_e$ and $P_e$ are understood as row vectors. It can be easily verified that $\hat{P}_e$ is a valid pmf since $$\hat{P}_e(k) = \sum_{i=1}^{K} P_e(i) q_{ik}, \quad (3)$$

and $$\sum_{k=1}^{K} \hat{P}_e(k) = \sum_{k=1}^{K} \sum_{i=1}^{K} P_e(i) q_{ik} \quad (4)$$

$$= \sum_{i} P_e(i) \sum_{k} q_{ik} \quad (5)$$

$$= 1. \quad (6)$$

Since Q is a Markov matrix, one may call the transform (2) "Markov transform". For the sake of brevity, one may assume that there is only one transform matrix Q for all pmf's in consideration. Extension to multiple transform matrices is straightforward and discussed further below.

It is proposed that Q be optimized by maximizing the log likelihood of parses of data $C_1$ measured by the transformed model $$M_1 = \{\hat{P}_e(\cdot)\}.$$

That is, the optimal Q is proposed to be $$\hat{Q} = \underset{Q}{\operatorname{argmax}} L(Q) \qquad (7)$$

$$= \underset{Q}{\operatorname{argmax}} \sum_{e=1}^{M} \sum_{k=1}^{K} C_e(k) \log \hat{P}_e(k) \qquad (8)$$

$$= \underset{Q}{\operatorname{argmax}} \sum_{e=1}^{M} \sum_{k=1}^{K} C_e(k) \log \left( \sum_{i=1}^{K} P_e(i) q_{ik} \right), \qquad (9)$$

subject to constraints $$\sum_{k=1}^{K} q_{ik} = 1 (i = 1, 2, L, K) \qquad (10)$$

$$q_{i,j} \geq 0, (i, j = 1, 2, L, K). \qquad (11)$$

Let $$\mathcal{D} = \left\{ Q : \sum_{k=1}^{K} q_{ik} = 1 (i = 1, 2, L, K); q_{ik} \geq 0, \right. \qquad (12)$$

$$(i, k = 1, 2, L, K) \Big\}$$

be the set of feasible points in $R^{K^2}$. It can be easily checked that D is a convex set. Furthermore, the function L(Q) is (not strictly) convex in Q: Let $Q_1 \in D$ and $Q_2 \in D$, and $Q_\theta = \theta Q_1 + (1-\theta)Q_2$. It follows from the convexity of the log function that $$L(Q_\theta) \geq \theta L(Q_1) + (1-\theta) L(Q_2), \text{ where } 0 \leq \theta \leq 1. \qquad (13)$$

Since D is closed and bounded (hence compact), and $L(Q) \leq 0$ the maximum of L(Q) exists. However, it is not necessarily unique. A counterexample is as follows.

Let $M = 1, K = 2, C_e(1) = C_e(2) = 1, P_e(1) = P_e(2) = \frac{1}{2}$, then it can be verified that any $$Q = \begin{pmatrix} a & 1-a \\ 1-a & a \end{pmatrix} \text{ for } 0 \leq a \leq 1$$

achieves the maximum $L(Q) = -2 \log 2$.

Since the value of K is typically small (e.g., from tens to several hundreds) and constraints in (10-11) are independent, each row of Q can be optimized sequentially using a general optimization package.

The disclosure now turns to a discussion of tests that were performed using the Markov transform discussed above.

Figure 2:
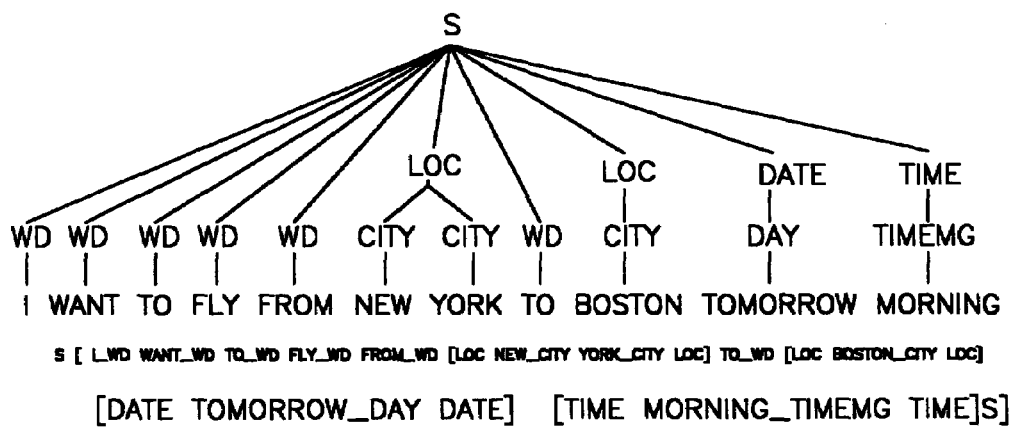
FIG. 2 illustrates a sample tree with semantic classes and Penn Treebank style representation.

Tests were performed on the classer of the IBM AirTravel system (presently a known research prototype). A "classer" groups words into semantic units, and this is typically done using a statistical model in the same way that a statistical syntax parser builds the syntax tree of an input sentence. A typical example is illustrated in FIG. 2. Pre-terminal nodes (i.e. nodes that are one level up from a leaf node in a parse tree) are also called "tags". In FIG. 2, "city", "day" and "wd" are examples of tags. The term "label" is reserved for non-terminals (i.e., nodes other than leaf nodes in a parse tree) other than tags. For example, "LOC", "DATE", "TIME" and "S" are labels in FIG. 2.

A statistical classer model for evaluation purposes included three components: one for tags, one for labels other than tags and one for extensions. The probability of a parse is given by the product of the three model components. For results reported here, a separate Markov matrix is used for each model component.

The baseline classer was trained with about ten thousand sentences, which are manually annotated. This training set includes sentences collected in an ATIS task (see Dahl, "Expanding the scope of the ATIS task: The ATIS-3 corpus", Proc. ARPA Human Language Technology Workshop, pp. 43-48, 1994). Adaptation experiments were performed on two test sets, wherein "TestSet 1" contained 2167 sentences and "TestSet 2" contained 1065 sentences. The two test sets represented a typical scenario where adaptation is desired; newly acquired data, to some extent, bears similarities to the original training data while new words and expressions are included as well. (For example, old ATIS data do not deal with multiple legs of a trip, but in recently collected data there are words such as "outbound", "inbound" and "legs" in "TestSet 2", which are not seen in the baseline training set.

Adaptation results are shown in Table 1. Integer numbers in the column "Top 1" represent the number of sentences that are classed correctly if the parse with the best score is collected. Also included in the "Top 1" column are percent sentence accuracies. The columns "Top 2" and "Top 3" represent the number of sentences that are correctly classed if the second or third choice is picked. It should be noted that sentence-level accuracy (exact match) is being measured, not constituent accuracy. This is different from the numbers reported in: Charniak, supra; Collins, "A new . . . ", supra; Collins, "Three . . . ", supra; and Magerman, supra.

Numbers in the column "ER" represent the relative error reduction of "Top 1" results. Rows marked with "base" represent results without adaptation while rows beginning with "1st", "2nd" and "3rd" contain results with one, two or three adaptations, respectively. The rows labelled "Truth" contain results that hold if true parses of the two test sets are used when carrying out adaptation. Accordingly, these numbers represent upper bounds of the performance of unsupervised adaptation.

TABLE 1

|  | Top 1 | Top 2 | Top 3 | ER (%) |
|---|---|---|---|---|
| TestSet 1 (Total: 2167) | | | | |
| base | 2021 (93.2%) | 44 | 8 | — |
| 1st | 2028 (93.6%) | 70 | 35 | 5% |
| 2nd | 2051 (94.7%) | 49 | 35 | 21% |
| 3rd | 2054 (94.8%) | 36 | 35 | 23% |
| Truth | 2082 (96.1%) | 48 | 6 | 42% |
| TestSet 2 (Total: 1065) | | | | |
| base | 850 (80%) | 18 | 3 | — |
| 1st | 872 (82%) | 27 | 52 | 10% |
| 2nd | 904 (85%) | 39 | 21 | 25% |
| 3rd | 917 (86%) | 34 | 20 | 31% |
| Truth | 957 (90%) | 29 | 5 | 50% |

As can be seen from Table 1, a 23% and 31% error reduction can be achieved for "TestSet 1" and "TestSet 2", respectively. It is interesting to note that the first adaptation results in a large improvement for "Top 2" and "Top 3" accuracy, which suggests that further adaptation is necessary. Compared with results using true parses as supervision information, one can also conclude that unsupervised adaptation can obtain over one half of the error reduction achieved by supervised adaptation.

There is a significant performance difference between "TestSet 1" and "TestSet 2". This is largely due to the fact that "TestSet 1" is more similar to training data than is "TestSet 2". This also helps explain why the relative error reduction of "TestSet 2" is larger than that of "TestSet 1".

The disclosure now turns to some general observations on the methods discussed herein, as well as to possible refinements of those methods.

The methods contemplated herein differ from conventional smoothing techniques in that, in Markov transform-based adaptation, there are interactions in the components of a pmf while a cache model smooths components of a pmf independently. When the transform (2) is carried out, it does not require the count of the original training data. This represents an advantage in comparison with MAP- or interpolation-style smoothing techniques.

As discussed heretofore, the transform Q is identical across pmf s in a model component. However, where there is sufficient data for adaptation, it is, of course, possible to use more than one transform. Modifying (9) is straightforward; if one assumes that there are T transforms and pmf nodes are partitioned into T groups $\zeta_1, L, \zeta_T$, then the objective function L is a sum of T independent components $L_i(Q_i)$ (i=1, L, T). Or $$L(\{Q_i\}) = \sum_{j=1}^{T} L_j(Q_j) \quad (14)$$

$$L_i(Q_i) = \sum_{e \in \varsigma_i} \sum_{k=1}^{K} C_e(k) \log \hat{P}_e(k; Q_i) \quad (15)$$

Each $Q_i$ can be optimized independently by maximizing $L_i(Q_i)$.

The Markov transforms discussed herein have $K^2-K$ free parameters, wherein K is the dimension of a pmf of the statistical model. In the experiments reported here, K is typically 5-8 times smaller than the number of pmf's (i.e., Min (9)). Thus, using a Markov transform provides a significant saving of parameters as compared with building a cache model. However, if $K \geq M$, it is recognized that the number of free parameters should be reduced. This could be done by putting more constraints on Markov matrices or by using other transforms with fewer free parameters.

In recapitulation, it has been shown herein that a Markov transform can be used to successfully adapt statistical parsers. Even when supervision information is missing, a 23% -31% relative error reduction can be achieved. Unsupervised adaptation gets roughly half of the error reductions that can be obtained if true supervision information is available.

It is to be noted that the algorithms contemplated herein can be applied to supervised adaptation, as well.

It is to be understood that the present invention, in accordance with at least one presently preferred embodiment, includes a statistical parser and an adapter, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for providing statistical parsing of speech and/or linguistic data, said method comprising the steps of:
   providing a statistical parser, the statistical parser including a statistical model which is able to decode more than one type of input; and
   adapting the statistical model via employing a mathematical transform;
   wherein the adapted statistical model is stored in a computer memory.

2. The method according to claim 1, wherein said step of adapting the statistical model comprises adapting the statistical model via employing a Markov transform.

3. The method according to claim 2, wherein said step of providing a statistical parser comprises assigning to the statistical model, prior to said adapting step, a probability mass function.

4. The method according to claim 3, wherein said step of assigning a probability mass function comprises writing a probability mass function as a row vector.

5. The method according to claim 4, wherein said step of adapting the statistical model comprises right-multiplying the row vector by a Markov matrix.

6. The method according to claim 2, wherein said step of adapting the statistical model comprises choosing a Markov matrix such that the log probability of given material is maximized.

7. The method according to claim 2, wherein said step of adapting the statistical model comprises unsupervised adaptation.

8. The method according to claim 7, wherein said step of adapting the statistical model comprises employing decoded parses of test material.

9. The method according to claim 2, wherein said step of adapting the statistical model comprises supervised adaptation.

10. The method according to claim 9, wherein said step of adapting the statistical model comprises employing adaptation material.

11. The method according to claim 2, wherein said step of providing a statistical parser comprises providing a statistical model which decodes linguistic input.

12. The method according to claim 2, wherein said step of providing a statistical parser comprises providing a statistical model which decodes speech input in speech recognition.

13. An apparatus for providing statistical parsing of speech and/or linguistic data, said apparatus comprising:
   a statistical parser;
   said statistical parser including a statistical model which is able to decode more than one type of input; and
   an adapter which adapts the statistical model via employing a mathematical transform;

wherein the adapted statistical model is stored in a computer memory.

14. The apparatus according to claim 13, wherein the mathematical transform employed by said adapter comprises a Markov transform.

15. The apparatus according to claim 14, wherein the statistical model is assigned, prior to adaptation, a probability mass function.

16. The apparatus according to claim 15, wherein the probability mass function is written as a row vector.

17. The apparatus according to claim 16, wherein said adapter is configured for right-multiplying said row vector by a Markov matrix.

18. The apparatus according to claim 14, wherein said adapter is configured for choosing a Markov matrix such that the log probability of given material is maximized.

19. The apparatus according to claim 14, wherein said adapter is configured to perform unsupervised adaptation at the time of adaptation.

20. The apparatus according to claim 19, wherein said adapter is configured to employ decoded parses of test material.

21. The apparatus according to claim 14, wherein said adapter is configured to perform supervised adaptation at the time of adaptation.

22. The apparatus according to claim 21, wherein said adapter is configured to employ adaptation material.

23. The apparatus according to claim 14, wherein the statistical model decodes linguistic input.

24. The apparatus according to claim 14, wherein the statistical model decodes speech input in speech recognition.

25. A program storage device readable by machine, tangibly embodying a program of instructions executable by the machine to perform method steps for providing statistical parsing of speech and/or linguistic data, said method comprising the steps of:

providing a statistical parser, the statistical parser including a statistical model which is able to decode more than one type of input; and adapting the statistical model via employing a mathematical transform;

wherein the adapted statistical model is stored in memory readable by the machine.

* * * * *